INVENTOR.
GEORGE F. WIKLE
BY Lester J. Bradley
ATTORNEY

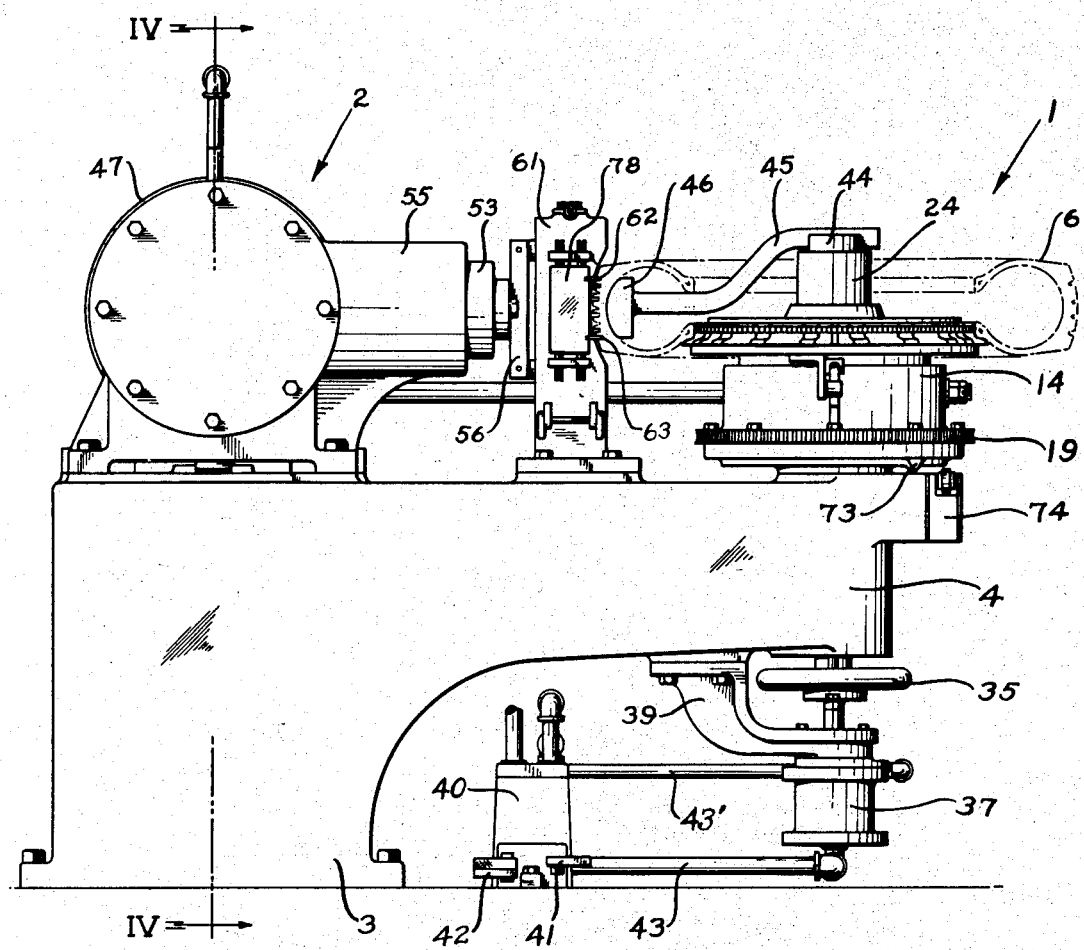
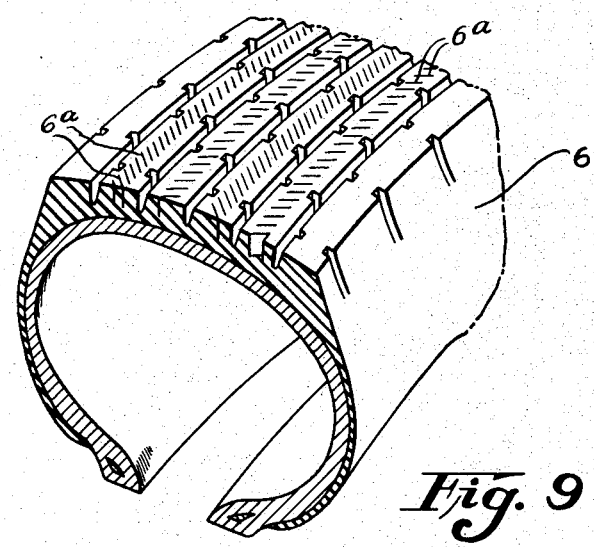

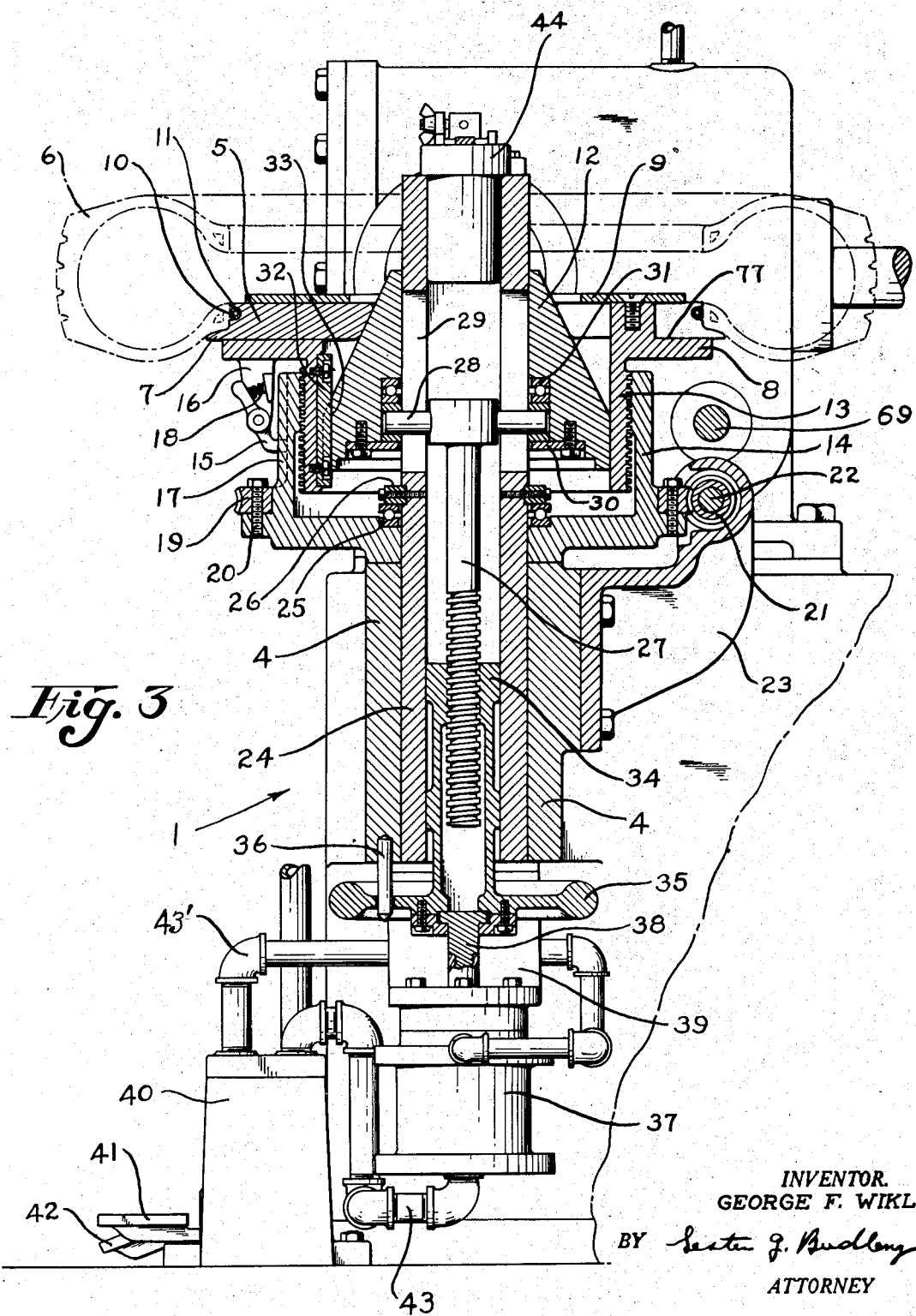

Jan. 6, 1942.                    G. F. WIKLE                    2,269,137
                        APPARATUS FOR TREATING TIRES
                          Filed April 12, 1940          5 Sheets-Sheet 4

INVENTOR.
GEORGE F. WIKLE
BY Lester G. Budlong
ATTORNEY

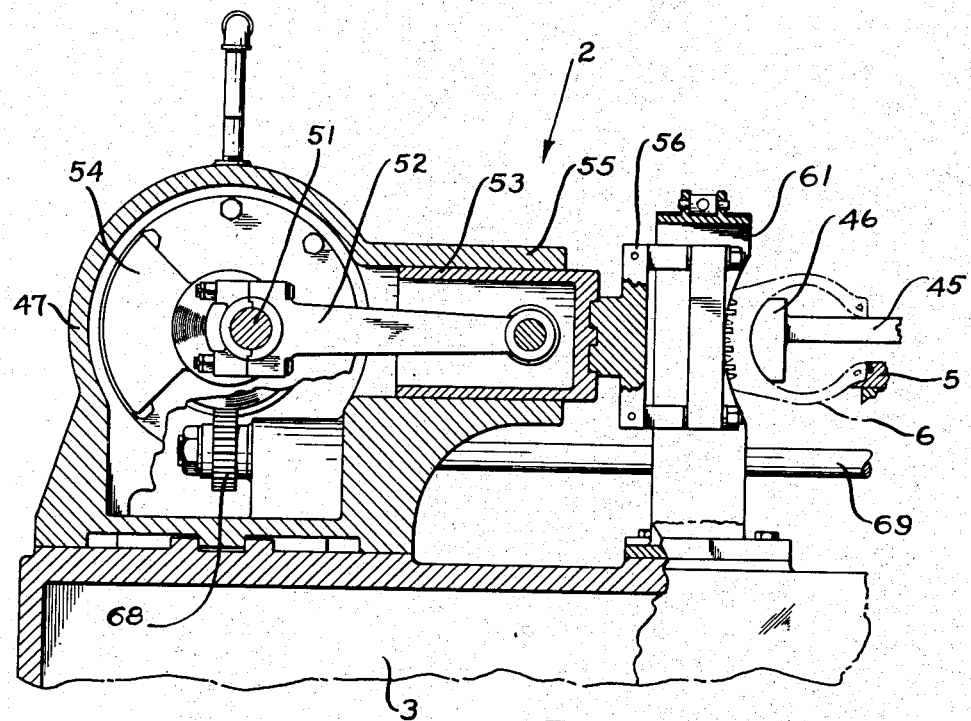
Fig. 6
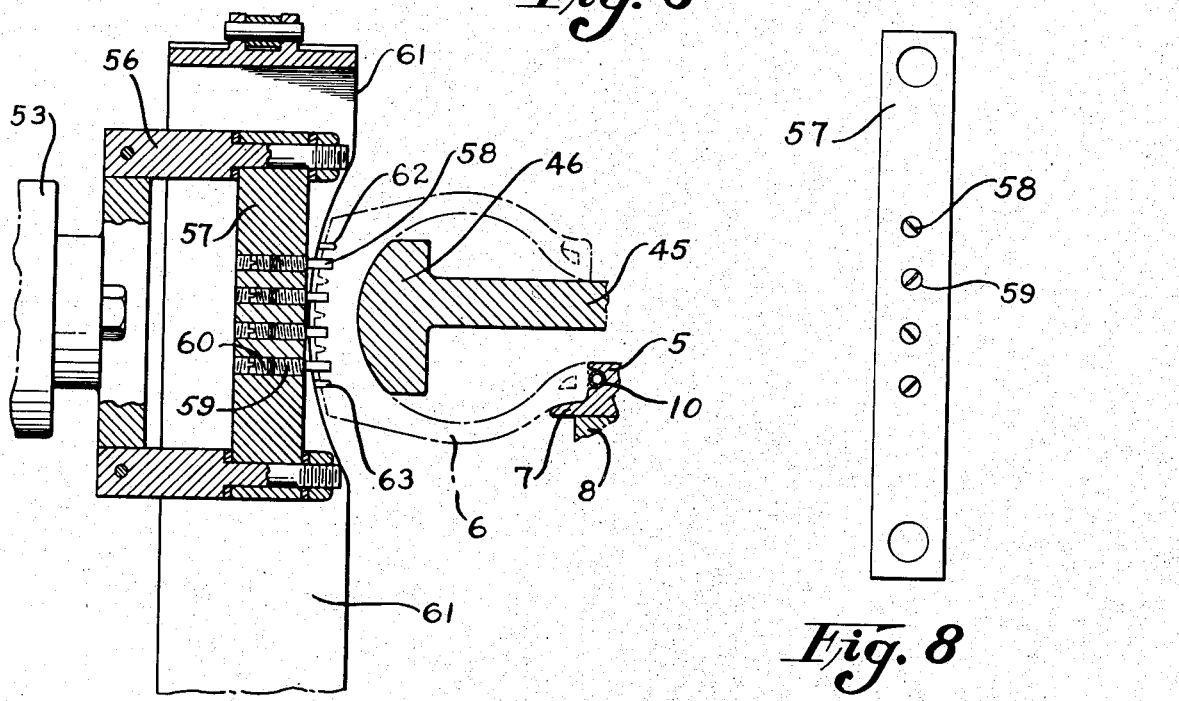
Fig. 7
Fig. 8
INVENTOR.
GEORGE F. WIKLE
BY Lester J. Budlong
ATTORNEY Patented Jan. 6, 1942

2,269,137

UNITED STATES PATENT OFFICE 2,269,137

APPARATUS FOR TREATING TIRES

George F. Wikle, Ann Arbor, Mich., assignor to United States Rubber Company, New York, N. Y., a corporation of New Jersey Application April 12, 1940, Serial No. 329,252

8 Claims. (Cl. 164—48)

This invention relates to an apparatus for treating tires, and, in particular, it relates to an apparatus for forming slits or incisions in the tread portion of pneumatic tires.

It has been found that slits or incisions formed in tire treads function effectively as gripping fingers for resisting of skidding of a vehicle on which such tires are applied. The present invention constitutes a commercial apparatus for forming such slits. In general, the invention consists of means for rotatably supporting a tire in combination with slitting means, and rigid means within the tire casing for resisting the impact of the slitting means.

Among the objects of the invention are to provide a tire supporting means which may be quickly operated for securely holding a tire in operative position and to provide an apparatus which will operate expeditiously and economically in continued use. Other features of the invention will appear in the following detailed description considered in connection with the accompanying drawings, in which:

Fig. 2 is a side elevational view thereof;

Fig. 3 is a transverse view, in section, taken along section line III—III of Fig. 1;

Fig. 6 is a view, in section, of a mechanism for forming slits in a tire tread, the section being taken along section line VI—VI of Fig. 1;

Fig. 7 is an enlarged view, in section, of slitting blades and a support therefor;

Fig. 8 is an enlarged end elevational view of the slitting bar, illustrating the relative positions of the knife blades; and Fig. 9 is a perspective view, in section, of a portion of a pneumatic tire treated in accordance with the apparatus disclosed herein such tire per se being disclosed in the patent to Havens No. 2,260,516.

Figure 1:
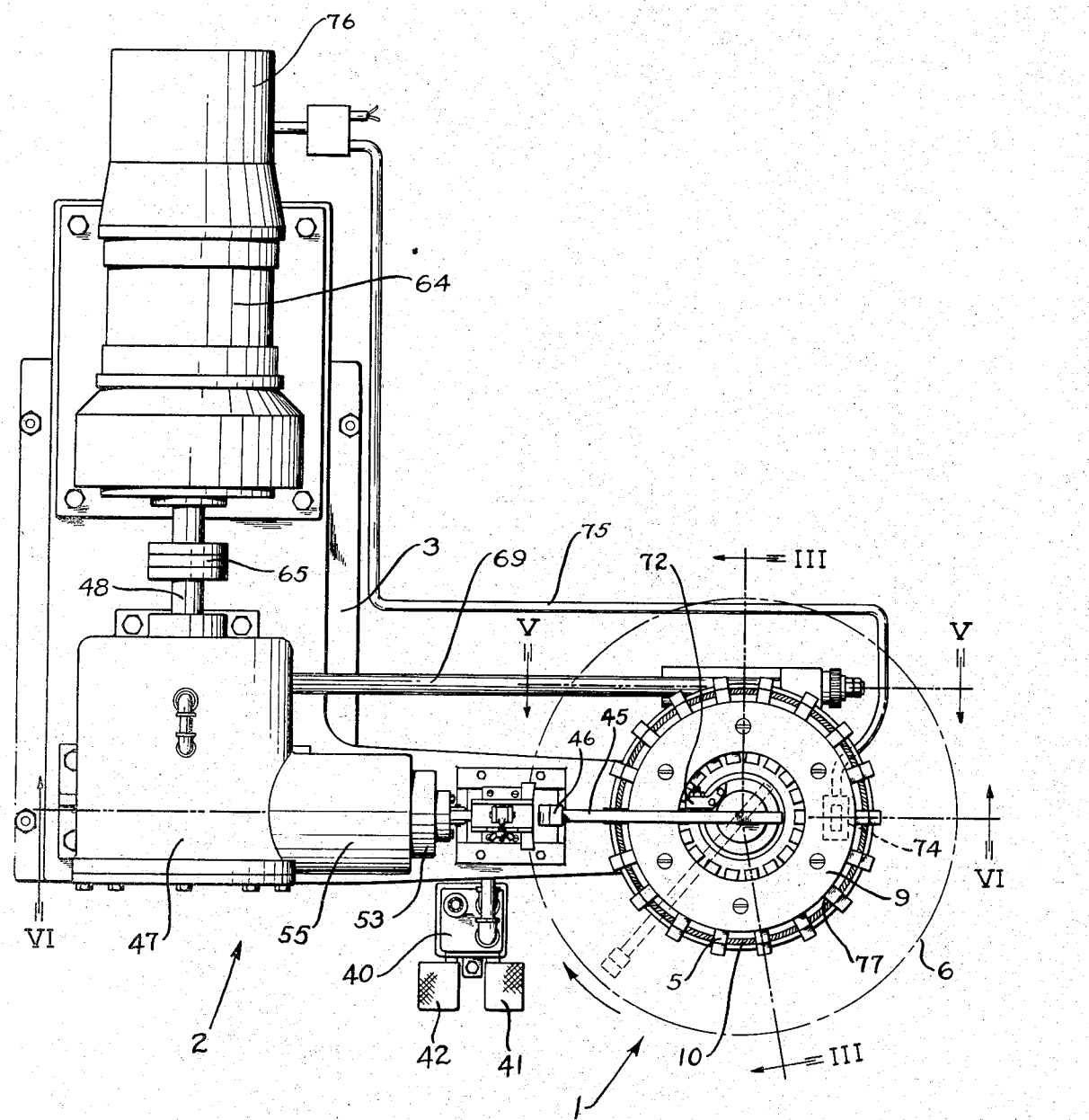
Fig. 1 is a plan view of an embodiment of my invention.

Referring to the drawings, and, in particular, to Fig. 1, I show, as an embodiment of my invention, a form of apparatus for slitting treads of pneumatic tires. For convenience this apparatus may be divided into two principal divisions 1 and 2, the reference character 1 denoting a tire supporting means, and the character 2 denoting reciprocating means for producing slits in a tire tread. As shown in Fig. 2, the entire mechanism is supported by a base frame 3 in which an over-hanging portion 4 provides a frame for the tire supporting means 1. The means 1 for supporting the tire is provided in the form of a plurality of segments 5 (Fig. 3) adapted to engage with one of the bead portions of a pneumatic tire 6. A projecting portion 7 on each of the segments 5 locates the vertical position of the tire 6. The segments 5 are movable radially inward and outward, in order to release and to grip the pneumatic tire and to permit the segments to engage with tires having different rim diameters. The segments 5 rest upon and are supported by a flange 8 which is provided with recesses 77 for the reception of the segments 5 and for guiding them in their radial movement. A plate 9 secured to the upper portion of the flange 8 confines the segments 5 to a radial movement. In order to maintain the segments in their collapsed or receded positions, an annular spring 10 encircles the periphery of the segments in a notch 11 provided therefor. The action of the spring maintains the segments in an inward position and in contact engagement with a centrally disposed cam member 12. Vertical movement of the cam 12 functions to move the segments to outward positions against the action of the spring 11.

Forming an integral part of the flange 8 is a downwardly extended cylindrical portion 13 having threads which engage complementary threads on an enclosing driving flange 14. The purpose of the threaded connection between the extended portion 13 and the driving flange 14 is to permit vertical adjustment of the segments 5 for the purpose of accommodating different sized tires. During ordinary operation the extended portion 13 is locked with the driving flange 14. This is accomplished by a latch member 15 pivoted to a bracket 16 extending from the flange 8. The latch member 15 engages a slot or keyway 17 formed in the driving flange 14. A spring 18 normally maintains the latch 15 in locking engagement with the slot 17. When adjustment is desired, the latch 15 is disengaged from the slot 17 and through the threads on the extended portion 13 and on the driving flange 14 the vertical position of the tire supporting segments 5 may be controlled. This adjustment is concerned with only the cross-sectional size of the tire.

As shown in Fig. 3 a worm ring gear 19 attached to the flange 14 by bolts 20 provides means through which the flange 14 may be rotated. A worm 21 is keyed to a shaft 22 rotatably carried by a bracket 23 (Fig. 4) which, in turn, is bolted to the frame 4, and engages with the worm ring gear 19. The shaft 22 is driven by means hereinafter described.

Keyed or held in pressed engagement with the frame 4 is a vertical sleeve 24. In order to maintain the driving flange 14 immovable vertically, a thrust bearing 25 is located around the vertical sleeve 24 and at the top central portion of the flange 14. A split collar 26 secured to the vertical sleeve 24 rests against the thrust bearing 25 and maintains the flange 14 in a free position for rotary movement. Within the vertical tubular member 24 is a threaded rod 27 adaptable for vertical movement and provided with a cross bar 28 at its head portion. Slots 29 are formed in the vertical tubular member 24 to provide clearance through which the cross rod 28 extends. The purpose of the cross bar 28 is to engage with the cam 12 and to cause it to move in a vertical path for actuating the segments 5 in their radial paths. A retaining plate 30 locks the cross bar 28 in engagement with the cam 12. To take the load of the cam 12 as it is rotatably supported by the cross bar 28, a thrust bearing 31 is located between the cam 12 and the cross bar 28. In order to insure rotary movement of the cam 12 with the segments 5, a key 32 is rigidly fastened to the inner wall of the extended portion 13 and a slot 33 is provided in the cam 12 for the reception of the key 32. This arrangement permits vertical movement of the cam 12 in relation to the flange 8 and its extended portion 13.

The threaded rod 27 is associated in complementary engagement with a threaded sleeve 34, the purpose of which is to form a continuation of the threaded rod 27 while at the same time permitting in effect an adjustment of its length. A hand wheel 35 placed at the lower end of the sleeve 34 provides manual means for adjustment of the length of the rod 27, thereby varying the vertical height of the cam 12 to compensate for different sizes of tires. A pin 36 pressed in the lower part of the frame 4 slidably engages the hand wheel 35 in order to maintain the relative position of the hand wheel 35. Adjustment of the hand wheel may be made when the hand wheel is in its lowermost position caused by actuation of an air cylinder 37. A piston rod 38 extending from the cylinder 37 forms a rotatable connection with the hand wheel 35, and a bracket 39 fastened to the lower portion of the frame 4 supports the cylinder 37. A conventional valve mechanism 40 having foot pedals 41 and 42 cooperating therewith permits actuation of the cylinder 37 through the conduits 43 and 43'. Actuation of the foot pedal 42 maintains the cam 12 in its upward engaged position, whereas actuation of the foot pedal 41 causes the cam 12 to recede to its lowermost position.

At the uppermost portion of the sleeve 24 is a plug 44 rotatably mounted therein. To this plug, as shown in Fig. 2, an arm 45 is attached, the end of which arm is provided with a shoe 46. This shoe is positioned in a fixed relation within the tire carcass and functions as an anvil or support for resisting the impact of the cutting mechanism 2 hereinafter described.

Means for operating the cutting mechanism 2 is located within a housing 47 mounted on the main frame 3. As shown particularly in Fig. 4, the housing 47 supports a drive shaft 48 by means of bearings 49 and 50. Keyed at the end of the shaft 48 and within the housing 47 is a crank arm 51 which engages a connecting rod 52 (Fig. 6) pivotally associated with a slidable piston 53. A counter balance 54 extending from the hub of the crank arm 51 maintains the balance of the assembly. A portion 55 of the housing 47 operates as a cylinder within which the piston 53 is reciprocated. Connected to the end of the piston 53 is a bracket 56 (Fig. 7) to which a plate 57 is disengageably secured. A plurality of knife blades 58 are supported by the plate 57 by means of threaded portions 59 which form a part of each knife blade 58. A set screw 60 locks each threaded portion 59 in a fixed position. Different bars or plates such as 57 may be provided for accommodating different sized tires or for forming different arrangements for sizes of slits. An example of one form of arrangement of slits is shown in Fig. 8 in which the knife blades are positioned at an angle of 45 degrees to the vertical, adjacent blades being oppositely inclined. In Figs. 7 it is noted that the shoe 46, which is maintained in a fixed position and upon which the tire 6 slides as it is rotated, maintains a rigid support or backing to resist impact of the reciprocating movement of the knife blades 58. A shield or guard 61 laterally encloses the reciprocating knife blades 58 merely as a matter of protection for the operator.

A pair of guides 62 and 63 attached to a plate 78 (Fig. 2) adjustably supported by the guard 61 slidably engage the outer grooves of the tire 6 for assisting in maintaining the tire 6 in a proper horizontal position relative to the knife blades 58.

Figure 4:
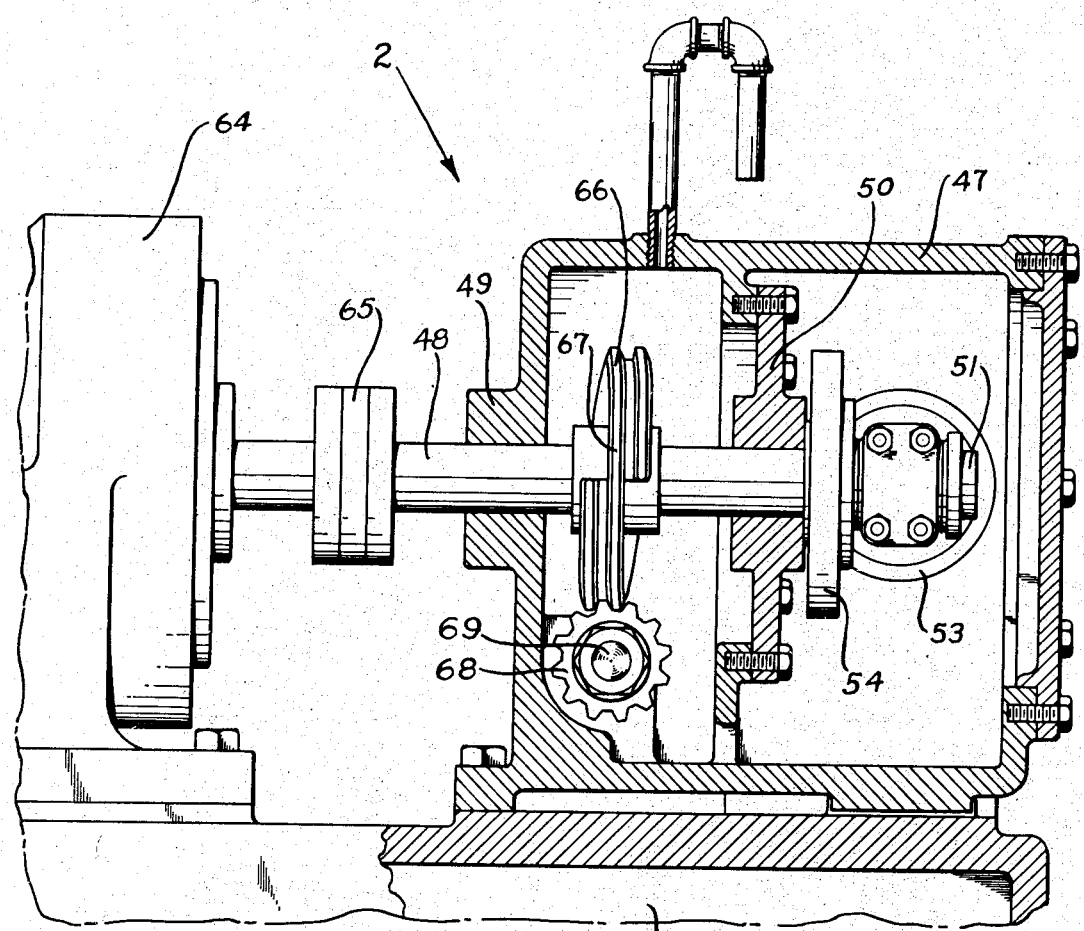
Fig. 4 is a transverse view, in section, taken along the section line IV—IV of Fig. 2.
Figure 5:
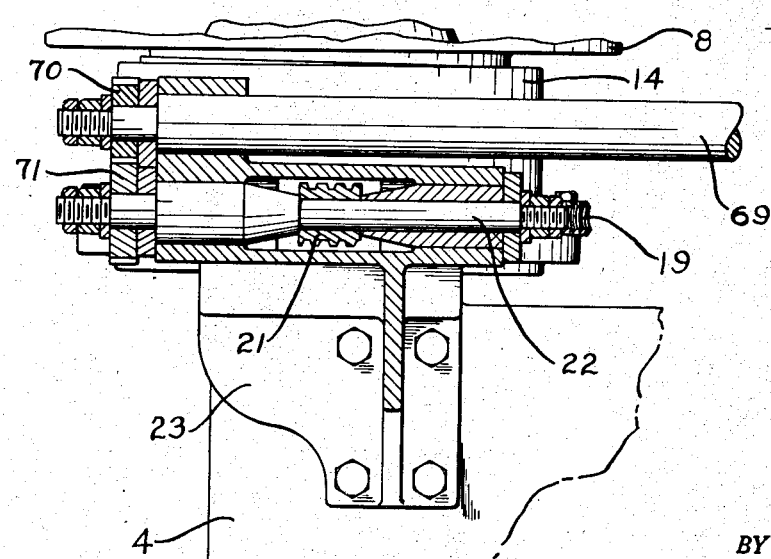
Fig. 5 is a detail view of a tire support drive, in section, taken along section line V—V of Fig. 1.

Referring to Fig. 4, the shaft 48 is connected to a motor 64 through a universal coupling 65. Keyed to the shaft 48 is a special worm gear 66 which includes straight portions 67 for the purpose of producing a drive which is intermittent in operation. In other words, the worm gear 66 functions in part as a cam to produce increments of rotary motion to a gear 68. Gear 68 is keyed to a shaft 69 supported by the housing 47. This shaft provides a drive for rotating the tire supporting means as shown in Figs. 1 and 5. The bracket 23 (Fig. 5) fastened to the frame member 4 provides a bearing for the end of the shaft 69. Associated with the end of the shaft 69 is a gear 70 which meshes with a gear 71 keyed to the shaft 22 which supports the worm 21.

By this arrangement the motor 64 rotates continuously causing a continual reciprocating motion of the knife blades, and through the medium of the cam gear 66 increments of rotary motion are imparted to the tire supporting means in such a manner that the cuts or incisions 6a, as shown in Fig. 9, are formed in the tire tread during each short interval the tire supporting means remains at rest. This cooperative relationship between the slitting and tire support driving means enables the slitting operation to be carried out at relatively high speeds. For example, in actual practice the slitting operation functions at the rate of 777 strokes per minute, each stroke producing four separate slits in the tire tread.

In the operation of the apparatus the tire supporting means is originally in its collapsed state and the knife blades are in their receded position. The operator moves the arm 45 and shoe 46 to a position as shown by the dotted lines in Fig. 1. In this location the tire is easily placed over the shoe and the bead portions of the tire are positioned on the supporting segments 5. The operator presses the foot pedal 42 to cause an upward movement of the cam 12, thereby expanding the segments 5 and rigidly supporting the tire 6. Thereafter the operator swings the arm 45 into position in alignment with the knife blades 58. An adjustable stop member 72 located on top of the vertical sleeve 24 maintains in combination with the rotary movement of the tire 6 the arm 45 in its proper relative position in alignment with the knife blades. A manual starting switch 72a is actuated by the operator for setting the apparatus in motion. When the tire 6 has made one complete revolution, a cam 73 (Fig. 2) located at the under side of the flange 14 engages with a cut-off switch 74 attached to the frame 4 to stop the turning movement. As shown in Fig. 1, a conduit 75 communicates between the cut-off switch 74 and a mechanism 76 forming a part of the motor 64. This mechanism 76 may be in the form of a magnetic brake which besides cutting off the power to the motor 64 will cause the mechanism to cease rotating substantially instantaneously.

From the foregoing description it is believed apparent that I have provided a novel construction and arrangement for the commercial operation of forming slits in tire treads, and while I have described a preferred embodiment of the invention, it is to be understood that other modifications may be appropriated, except as restricted by the scope of the appended claims.

Having thus shown and described my invention, what I claim and desire to protect by Letters Patent is:

1. An apparatus for slitting treads of pneumatic tires comprising means for rotatably supporting a tire, a cutter support, at least one knife blade attached to the support, driving means for moving the cutter support reciprocally and continuously in a predetermined path radially of the tire, means cooperating with the cutter driving means for rotating the tire support during a portion of the stroke cycle of the reciprocally moving cutter support, a rigid backing lying within the tire casing and adapted to support the tire against the knife thrust, manual means for starting the slitting operation, and automatic means for stopping the operation upon a complete revolution of the tire support.

2. In an apparatus for slitting treads of pneumatic tires, a cutter support, at least one knife blade attached to the support, positive means for moving the cutter support reciprocally and continuously in a predetermined path radially of the tire, a chuck adapted to support the tire in a horizontal plane and in the path of the knife blade comprising a plurality of radially movable jaws positioned to engage the lowermost tire bead, a vertically movable cam for moving the jaws outwardly, and means for vertically adjusting the height of the jaws.

3. In an apparatus for slitting treads of pneumatic tires, a cutter support, at least one knife blade attached to the support, positive means for moving the cutter support reciprocally and continuously in a predetermined path radially of the tire, a rigid backing lying within the tire casing and adapted to support the tire against the knife thrust, a chuck adapted to support the tire in a horizontal plane and in the path of the knife blade comprising a plurality of radially movable jaws positioned to engage the lowermost tire bead, and a vertically movable cam for moving the jaws outwardly.

4. In an apparatus for slitting treads of pneumatic tires, a cutter support, at least one knife blade attached to the support, driving means for moving the cutter support reciprocally and continuously in a predetermined path radially of the tire, means cooperating with the cutter driving means for rotating the tire support during the backward stroke of the reciprocally moving cutter support, a rigid backing lying within the tire casing and adapted to support the tire against the knife thrust, a chuck adapted to support the tire in a horizontal plane and in the path of the knife blade comprising a plurality of radially movable jaws positioned to engage the lowermost tire bead, and a vertically movable cam for moving the jaws outwardly.

5. In an apparatus for slitting treads of pneumatic tires, means for rotatably supporting a tire, means for imparting increments of rotary motion to the tire supporting means, a cutter support, at least one knife blade attached to the support, a crank arm, a drive therefor for moving the cutter support reciprocally and continuously in a path radially of the tire, said means for rotatably supporting the tire comprising a chuck adapted to support the tire in a horizontal plane and in the path of the knife blade, a plurality of radially movable jaws positioned to engage the lowermost tire bead, and a vertically movable cam for moving the jaws outwardly.

6. In an apparatus for slitting treads of pneumatic tires, means for rotatably supporting a tire, means for imparting increments of rotary motion to the tire supporting means, a cutter support, at least one knife blade attached to the support, a crank arm and a drive therefor for moving the cutter support reciprocally and continuously in a path radially of the tire, a rigid backing lying within the tire casing and adapted to support the tire against the knife thrust, said means for rotatably supporting the tire comprising a chuck adapted to support the tire in a horizontal plane and in the path of the knife blade, a plurality of radially movable jaws positioned to engage the lowermost tire bead, and a vertically movable cam for moving the jaws outwardly.

7. In an apparatus for slitting treads of pneumatic tires, means for rotatably supporting a tire, means for imparting increments of rotary motion to the tire supporting means, a cutter support, at least one knife blade attached to the support, a crank arm and a drive therefor for moving the cutter support reciprocally and continuously in a path radially of the tire, a rigid backing lying within the tire casing and adapted to support the tire against the knife thrust, manual means for starting the slitting operation and automatic means for stopping the operation upon a complete revolution of the tire support, said means for rotatably supporting the tire comprising a chuck adapted to support the tire in a horizontal plane and in the path of the knife blade, a plurality of radially movable jaws positioned to engage the lowermost tire bead, and a vertically movable cam for moving the jaws outwardly.

8. A tire tread treating device comprising a tire support, means for rotating the support step by step, a slitting blade, and means for positively reciprocating the blade in a predetermined path radial to the tire and to a predetermined position in said path to slit the tire to a predetermined depth, said rotating means and reciprocating means being synchronized to move the blade into contact with the tire during the period that the tire is at rest between successive rotating steps.

GEORGE F. WIKLE.